April 27, 1926.

J. B. GREER

GLASS CUTTING MACHINE

Filed Dec. 22, 1921

WITNESSES

INVENTOR
James B. Greer
By Winter & Brown
His attys

April 27, 1926.

J. B. GREER

GLASS CUTTING MACHINE

Filed Dec. 22, 1921

WITNESSES

J. Herbert Bradley

INVENTOR

James B. Greer
By Winter & Brown
his attys.

April 27, 1926.

J. B. GREER 1,582,679

GLASS CUTTING MACHINE

Filed Dec. 22, 1921

WITNESSES
J. Herbert Bradley

INVENTOR
James B. Greer
By Winter & Brown
his attys.

April 27, 1926.

J. B. GREER 1,582,679

GLASS CUTTING MACHINE

Filed Dec. 22, 1921    5 Sheets-Sheet 5

WITNESSES
J. Herbert Bradley

INVENTOR
James B. Greer
By Hunter & Brown
his Attys.

Patented Apr. 27, 1926.

1,582,679

UNITED STATES PATENT OFFICE.

JAMES BOYD GREER, OF PITTSBURGH, PENNSYLVANIA.

GLASS-CUTTING MACHINE.

Application filed December 22, 1921. Serial No. 524,235.

*To all whom it may concern:*

Be it known that I, JAMES BOYD GREER, a citizen of the United States, and a resident of Pittsburgh, in the county of Allegheny and State of Pennsylvania, have invented a new and useful Improvement in Glass-Cutting Machines, of which the following is a specification.

This invention relates to glass cutting machines, and more particularly to that type of machine used for cutting or grinding ornamental designs into the surfaces of glass articles, such as drinking glasses, tumblers, and other articles similarly shaped.

The object of the invention is to provide a machine of the class referred to which is strong and durable, which requires little attention on the part of the operator, which performs its cutting functions automatically and which is highly efficient in operation.

It is a special object of the invention to provide a cutting machine which requires no attention whatever from the operator, except the placing of the blank to be cut upon the machine and the removal of the finished article after the cutting has been completed.

It is also an object to provide a machine on which a plurality of articles may be simultaneously operated upon under the care of a single operator.

Other special objects of the invention are to provide a machine for automatically applying a design to the surface of the article acted upon, to provide means for automatically imparting a step-by-step rotation to the article, for varying the degree of such step-by-step rotation, and for applying the design during the pauses in the rotation thereof, to provide means for maintaining the article-carrying chuck in proper indexed position during the periods during which it is at rest, to provide means for controlling the cutting mechanism to automatically compensate for inequalities in the surface of the articles cut, to provide means to insure a uniform depth of cut by the cutting mechanism, to provide means whereby the machine will automatically adjust itself to articles of varying size, to provide means to automatically release the chuck and stop the cutting operation at the completion of the design that is being applied to the article operated upon, and to provide means for readily adjusting the mechanism for performing the several operations above mentioned.

These and other objects of the invention will more readily appear when taken in connection with the following description and the appended claims.

In the accompanying drawings which illustrate the preferred embodiment of the invention

The machine illustrated comprises in its entirety a plurality of individual cutting or grinding machines, and an operating table carrying said machines to bring the same successively around in front of the operator, together with mechanism for rotating the operating table and automatically operating the several machines from a single motor, as hereinafter described.

In the particular machine illustrated, there are twelve individual cutting or grinding machines, but obviously the number can be varied. Each of these machines may be of the specific construction of those illustrated, namely for cutting a design horizontally around a tumbler or similar article, or may be for cutting longitudinal flutes in such articles, or some may be of one construction and the others of the other construction.

Each of these forms of machines comprises a pair of cutting or grinding discs 1, operating on opposite sides of the tumbler 2, or other article to be cut, said cutting discs being secured to shafts 3 provided with pulleys 4 driven by belts 5 from underneath mechanism, one of which belts is crossed in order that the discs may be driven in opposite directions; a chuck 6 for holding the tumbler or other article and which chuck is automatically closed, as by a spring, and opened by pushing on a reciprocating rod 7 at the proper time from the underneath mechanism as hereinafter described; and a shaft 8 for operating mechanism within said machine to move the cutters away from the tumbler or other article after each individual cut; other mechanism for, intermediately of such movement of the cutters, indexing or stepwise rotating the chuck carrying the tumbler or other article, and for automatically stopping the cutting operation of the machine when the desired design has been finished, said shaft 8 being provided with a driving pulley 9 driven by a belt 10 from the underneath mechanism, said pulley 9 being loose on said shaft and arranged to be operatively connected thereto by a suitable clutch which is thrown by an operating lever 11, to throw the machine in operation, as hereinafter described, and which clutch is automatically disengaged from the mechanism within the individual cutting machine when the desired design has been finished, and also from the underneath mechanism.

Figure 1:
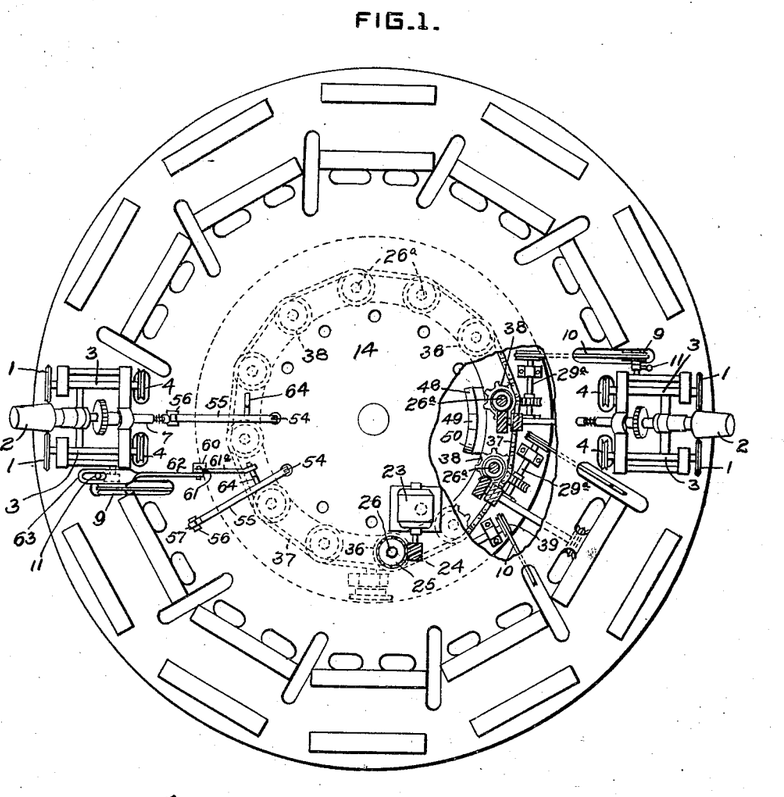
Fig. 1 is a plan view of the cutting apparatus showing two of the grinding machines mounted in operative position, and with a portion of the supporting table broken away to disclose its driving mechanism.
Figure 2:
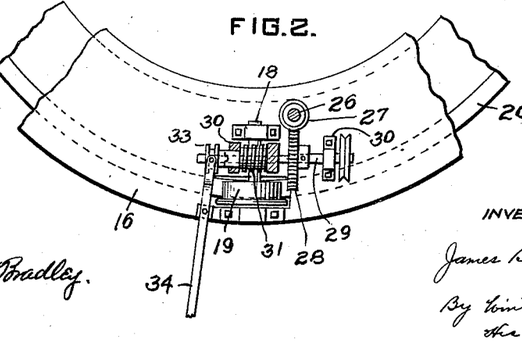
Fig. 2 a fragmentary plan view of a portion of the driving mechanism for the supporting table.
Figure 3:
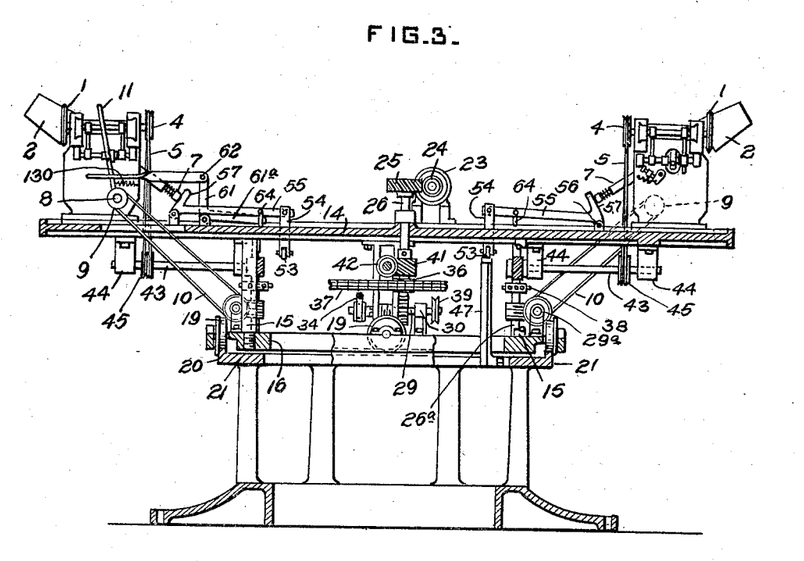
Fig. 3 a vertical sectional view of the apparatus illustrated in Fig. 1.
Figure 4:
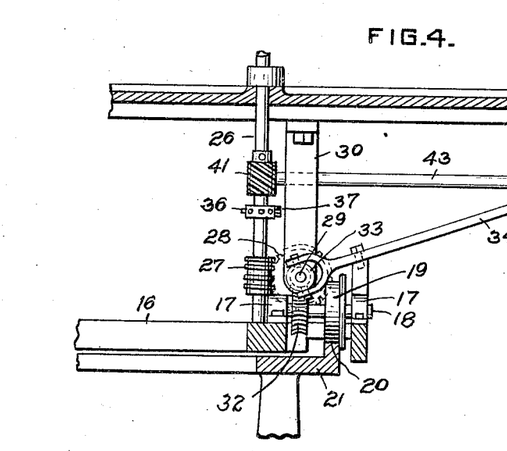
Fig. 4 an enlarged detail view partly in section and partly in elevation showing the mechanism for connecting and disconnecting the table driving mechanism.

These individual machines are mounted upon an operating table comprising the table proper 14 mounted on the upper ends of standards 15 secured to a bottom ring 16 to which are secured bearings 17 for the journals of axles 18 of wheels 19 running on the annular track 20 of the base 21, thus enabling the operating table carrying the individual cutting or grinding machines to rotate, to bring said machines successively in front of the operator.

Mounted on the table 14 is an electric motor 23 whose armature shaft is provided with a spiral pinion 24 meshing with a spiral gear 25 on a vertical shaft 26 mounted in bearings in the table 14 and ring 16. Shaft 26 is provided near its lower end with a worm pinion 27 which meshes with a worm wheel 28 on a horizontal tangential shaft 29 mounted in suitable bearings 30 carried by the ring 16 and which shaft 29 is provided with a worm pinion 31 meshing with a worm wheel 32 on the axle 18 of one of the wheels 19, thus driving said wheel and causing the operating table to travel in a circular path on the track 20. Worm pinion 31 is loose on shaft 29 and is operatively connected thereto by a sliding clutch 33 arranged to be actuated by a hand lever 34, in order to stop the rotation of the operating table when desired, as, for instance, when it is necessary to grind the cutting discs or for other purposes.

Shaft 26 also has secured thereto a sprocket wheel 36 which is connected by sprocket chain 37 to similar sprocket wheels 38 on other vertical shafts 26ª, eleven such shafts 26ª being used in the particular machine illustrated which has twelve individual cutting machines. Shafts 26ª are mounted at their ends in the table 14 and ring 16 respectively and through sprocket chain 37 are driven in unison with and at the same speed as shaft 26. These shafts 26ª are also provided with worm pinion 27, meshing with a worm wheel 28 on horizontal tangential shafts 29ª mounted in bearings 30 carried by the ring 16, and which shafts 29ª are therefore driven in unison with and at the same speed as shaft 29, and are similar to shaft 29 except that they do not carry a pinion 31 and clutch 33. The shaft 29 and the eleven shafts 29ª are each provided with a pulley 39 for receiving the belt 10 running to the driving pulley 9 of an individual machine. Consequently through the mechanism described the actuating pulley of each of the cutting or grinding machines is constantly driven.

Each of the vertical shafts 26 and 26ª is also provided with a spiral pinion 41 meshing with a spiral gear 42 on a horizontal radial shaft 43 mounted in bearings 44 depending from the table 14. Each of said shafts is provided near its outer end with a double pulley 45 receiving the belts 5 which drive the cutting or grinding discs of the individual machines. Consequently through this mechanism the grinding discs of the individual machine are constantly driven in opposite directions as described. Inasmuch as spiral gears connect shaft 43 with the vertical shafts 26, 26ª these shafts will be rotated at a much higher speed than the shafts 29 and 29ª which are connected to the vertical shafts, 26, 26ª by worm gearing.

By the mechanism so far described the operating table is continuously rotated (except when the clutch 33 is disconnected from pinion 31) to carry the individual machines around to successively bring them in front of the operator. In the movement of a given cutting or grinding machine from in front of the operator until it again comes before the operator, the individual machine acts automatically to cut the desired design in the tumbler, and to stop the cutting operation automatically when said design is finished. When the machine again comes before the operator the chuck 6 is released, permitting the operator to remove a finished tumbler and to put on a new tumbler, whereupon the chuck automatically grips; and as said machine proceeds it is again automatically thrown into operation to repeat the cutting of the design on the new tumbler.

Figure 5:
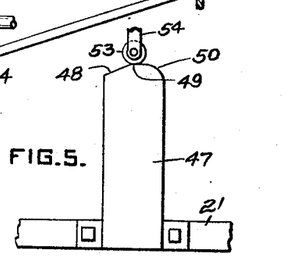
Fig. 5 a detail view of the cam device for operating the chucks of the several grinding machines.

The mechanism for automatically opening the chuck comprises a post 47 secured to the base 21 and projecting upwardly within the ring 16 and provided at its upper end with a gradually rising sloping face 48, a short substantially horizontal face 49 and a curved receding face 50. Reciprocating through an opening in table 14 is a vertical member 54 having an anti-friction roller 53 attached to its lower end for engaging the upper cam face of post 47, said member being pivoted to the end of an angle lever 55 fulcrumed at 56 in a suitable bearing on the upper face of table 14, and having a short inclined arm 57 arranged to bear against the reciprocating rod 7 of the chuck, all these parts being so proportioned that when roller 53 rides over the cam post 47 the lever 55 is oscillated to move the chuck rod 7 upwardly, thus opening said chuck and permitting the removal of a finished tumbler or other article, and when said roller 53 rides off the cam face on post 47 the spring in the chuck again automatically closes the same to hold in position a tumbler or other article newly placed upon said chuck. In this way the chuck of each individual machine is automatically opened and again automatically closed during the time that the individual machine is passing in front of the operator, thus permitting the removal of a finished tumbler or other article and the placing of a new one upon the chuck.

As hereinbefore described the cutting operation of each individual machine is automatically stopped by mechanism within the machine, hereinafter described, when the desired design has been finished. This automatic stopping occurs before the individual machine reaches the position in which the chuck is opened, and is done by unclutching operating pulley 9 from its shaft 8, also by mechanism within the machine, hereinafter described. To again automatically clutch said pulley 9 to shaft 8 in order to again start the cutting operation of the individual machine, the following mechanism is provided: Mounted in a suitable bearing 60 adjacent to each individual cutting or grinding machine is an angle lever having a vertical arm 61 to whose upper end is hinged a rod 62 provided with a large opening 63 embracing the lever 11 which shifts the clutch for connecting pulley 9 to shaft 8. The horizontal arm 61$^a$ of said angle lever overlies a pin 64 which is secured to and projects horizontally from the lever 55 of the next succeeding machine. Consequently when the lever 55 of a given machine is oscillated to open the chuck on that machine, through pin 64, angle lever 61, 61$^a$ is rocked and thus through rod 62 operates the clutch lever 11 in a direction to shift the clutch to lock the pulley 9 to the shaft 8 and thus setting the operating mechanism of that preceding machine into action. Consequently after the machine passes the operator and has a new tumbler or other article chucked therein, it passes on and its operating mechanism is automatically put into action when the chuck on the next succeeding machine is being opened.

It now remains to describe the mechanism within each of the individual cutting and grinding machines, for automatically cutting the desired design thereinto. This mechanism comprises, in general, means for periodically moving the cutting discs away from the tumbler or other article, after individual cuts, means for automatically rotating or indexing the chuck carrying the tumbler or other article when said grinding wheels or discs are moved apart, means for automatically unclutching pulley 9 from shaft 8 when the design has been finished, as well as certain adjusting and gaging means hereinafter described.

Inasmuch as all of the individual machines are identical in construction and operation a description of one will suffice for all.

As stated above, the particular cutting and grinding machine illustrated comprises a pair of cutting or grinding discs 1 for acting on opposite sides of the tumbler or other article 2, said grinding discs being mounted on shafts 3 provided with pulleys 4, receiving belts 5 for driving said shafts in opposite directions; a chuck for holding the tumbler or other article 2 and which chuck is opened by a reciprocating rod 7 and automatically closed by a spring 7$^a$; a shaft 8 for operating the mechanism within the machine, said shaft being provided with a loose pulley 9 receiving a belt 10 from a pulley 39 for constantly rotating said pulley; and a clutch with an operating lever 11 for shifting said clutch to lock pulley 9 to shaft 8. Shaft 8 operates mechanism within the machine to move the grinding or cutting discs 1 periodically apart to free the tumbler or other article 2 to permit indexing the chuck holding the tumbler; mechanism for rotating or indexing the chuck when the cutting or grinding discs are moved apart; and mechanism for automatically stopping the action of the machine when the complete design has been cut in the tumbler or other article. The machine also comprises various adjustments to adapt the machine for cutting tumblers or other articles of varying diameters or widths, for varying the design by varying the degree of indexing or rotation of the chuck at each indexing movement, for securing uniformity of depth of cuts on the tumbler or other article irrespective of irregularities in shape or wall thickness of the tumbler or other article, as well as for other purposes hereinafter described.

Figure 6:
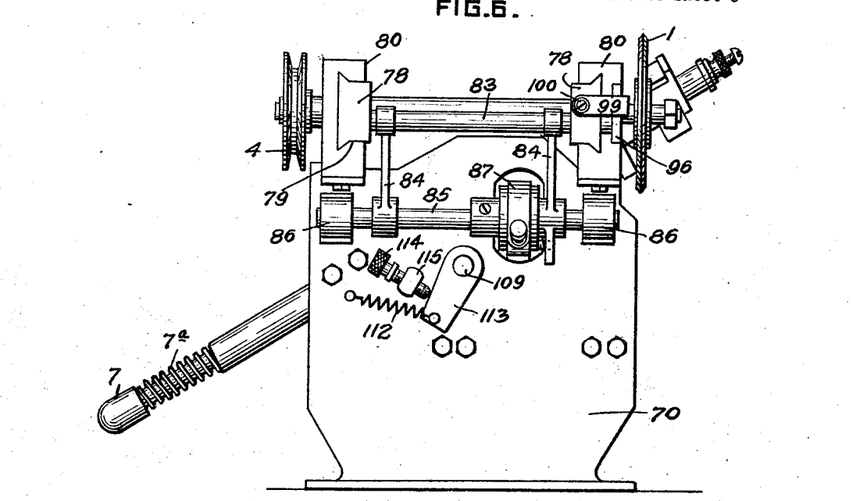
Fig. 6 a side elevation of one of the grinding machines.
Figure 8:
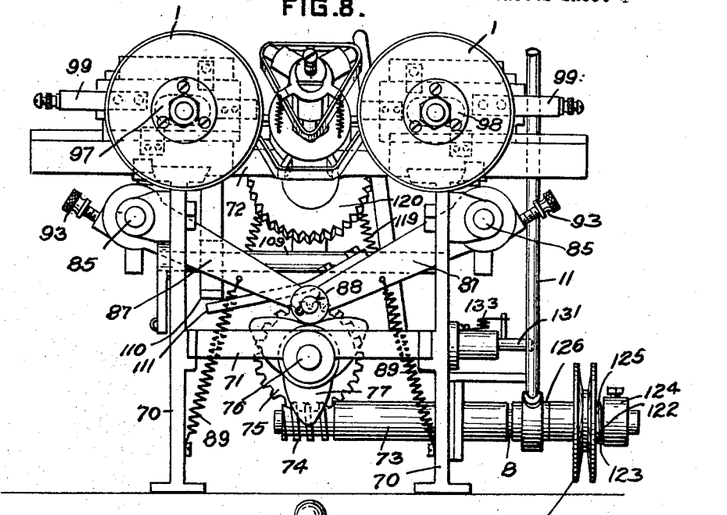
Fig. 8 an elevation of one of the grinding machines taken in a plane at right angles to that of Fig. 6.
Figure 9:
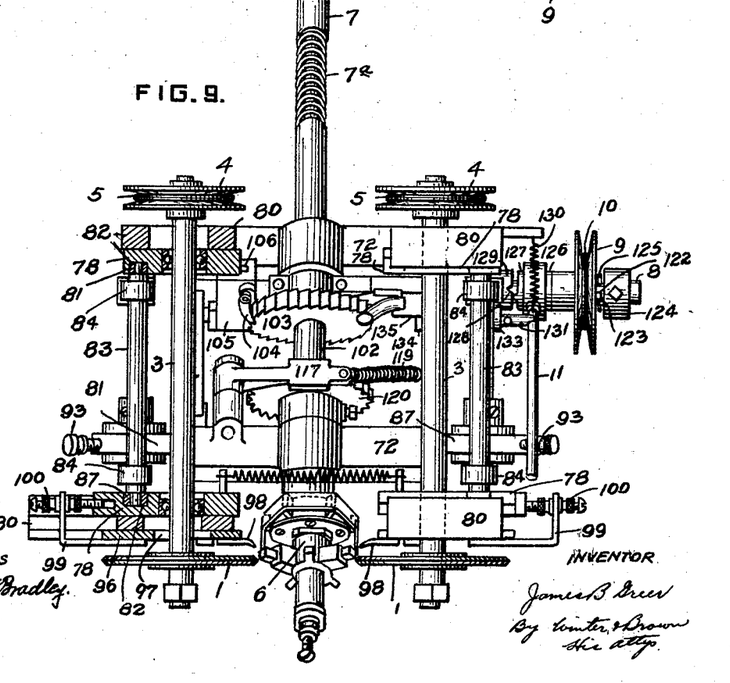
Fig. 9 a horizontal sectional view with parts shown in elevation of the machine illustrated in Fig. 8.

As illustrated the machine frame comprises a pair of side frame members 70, a pair of lower transverse connecting members 71, and a pair of upper transverse connecting members 72. Operating shaft 8 is mounted in suitable bearings 73 secured to one of the side frame members, and at its inner end is provided with a worm 74 which meshes with a worm wheel 75 on a longitudinal horizontal shaft 76 mounted in bearings on the bottom cross transverse members 71. The shaft 76 has secured to it a cam 77 which effects the necessary movements for withdrawing the cutting discs away from the tumbler or other article and also for indexing the chuck and for stopping the machine.

The means for effecting the separation of the cutters is as follows: The shafts 3 carrying the cutting discs are mounted in bearings in slides 78 which are dove-tailed in and horizontally movable in ways in blocks 80 secured to the upper ends of the side frame members 70, there being two slides for each shaft 3. These slides are provided with vertical grooves 81, which receive vertical slide members 82 provided with openings for receiving the ends of horizontal rods 83, said rods being secured in the upper ends of arms 84, whose lower ends are secured to a horizontal rock shaft 85 mounted in bearings 86 on the side frame members. Secured to each of these rock shafts is an arm 87 which extends inwardly and has its inner end provided with a roller 88 which rides on the cam 77 and is held in constant engagement therewith by a helical tension spring 89 having one end connected to arm 87 and its opposite end to a side frame of the machine, the springs 89 thus moving the cutters under a yielding pressure. Consequently the movement of the cam rocks the frame comprising the rock shaft 85, arms 84 and horizontal rod 83, and thus moves the slides 78 in the ways 79 in a direction to move the shafts 3 outwardly, such outward movement of the shafts occurring after the cut of the required depth has been made in the tumbler or other article. In order that the cutting discs may be adjusted for tumblers of different diameters, the arms 87 are adjustably connected to the rock shafts 85. To this end the hub 90 of each arm 87 is loose on its rock shaft 85, and is provided with a segmental slot 91 for receiving a pin 92 carried by the hub of the adjacent arms 84, and is provided with a threaded hole receiving an adjacent screw 93 which bears against the pin 92 so that by changing the adjusting screw 93 the angular relation of rock shafts 85 relative to the arms 87 can be varied, as will be obvious, so as to separate the cutting disc shafts more or less for the purpose stated.

In order to limit the depth of each cut of the cutting or grinding discs, so as to get uniform depth of cuts on opposite sides of a tumbler or other article having walls whose thickness is not uniform entirely around the tumbler, the following means is employed: The forward block 80 of each of the shafts 3, on the face opposite that in which the slide 78 is mounted, is provided with a horizontal way in which moves a secondary slide 96 having a large opening 97 through which the shaft 3 passes. This slide carries a feeler 98 adapted to contact with the surface of the tumbler when the desired depth of cut has been reached, and at its opposite end is provided with an angular member 99 which is adjustably secured to the outer end of slide 78 by means of screw 100. By means of this screw the position of the end of the feeler 98 can be varied, so as to get any desired depth of cut. But to whatever position adjusted, when the end of this feeler contacts with the surface of the tumbler or other article being cut, further inward movement of the slide 96 is prevented, and this through the angle member 99 and screw 100 prevents further inward movement of slide 78, and consequently further inward movement of the cutting disc. This stopping of inward movement of any one cutting disc is entirely independent of the inward movement of the other cutting disc, for the reason that the inward movement of the two discs is effected by means of the spring 89, so that obviously each cutting disc can move inwardly until its individual feeler contacts with the surface of the tumbler or other article being cut.

Figures 10, 12:
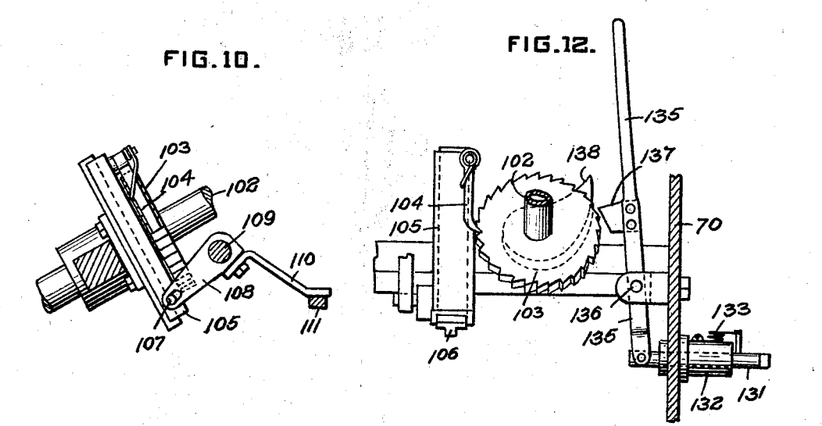
Fig. 10 a detail elevation of the dog employed for indexing the chuck.
Fig. 12 a detail view of the mechanism used for disconnecting the grinding machine from its driving mechanism at the end of the cutting operation.

The cam 77 also effects the indexing of the chuck 6 by the following means:

Chuck 6 is secured to the hollow shaft 102 which is mounted in bearings in the top cross frame members 72. Shaft 102 is provided with a ratchet wheel 103, with which cooperates a spring pressed pawl 104 which is pivotally mounted on slide 105 which has a substantially vertical movement on the guide 106. The lower end of slide 105 carries a pin 107 which engages in a slot in the end of arm 108 secured to the rock shaft 109 which extends horizontally across the frame with its ends mounted in the side frame members. Arm 108 is provided with an extension 110 which projects above an extension 111 on the arm 87 which actuates the rock shaft 85 on the opposite side of the machine. Consequently when the cam 77 actuates rock shafts 85, through these arm extensions, rock shaft 109 is also actuated, and thus through arm 108 moves the slide 105 downwardly to depress the pawl 104 to positively rotate ratchet wheel 103. When the cam 77 recedes to allow arms 87 to drop, rock shaft 109 is free to rotate in the opposite direction, and it is rotated in the opposite direction, to move slide 105 upwardly, thus causing the pawl to click into a new notch in the ratchet wheel 103, by means of a helical tension spring 112 secured at one end to a side frame member 70, on the outside thereof, and at its opposite end to the end of an arm 113 on the outer end of rock shaft 109, said spring thus rotating rock shaft 109 backwardly and moving slide 105 and pawl 104 to bring the pawl into engagement with a new tooth on the ratchet wheel 103. The degree of rotation of the chuck shaft can be varied by varying the angular position of rock shaft 109. This is effected by means of an adjusting screw 114 threaded through a projection 115 on the outside of frame member 70 and having its end contacting with the arm 113 so as to limit the extent of movement of rock shaft 109 under the action of spring 112, and thus varying the number of teeth of ratchet wheel 103 over which the pawl 104 will pass during the backward movement. In this way the mechanism can be made to index the chuck through distances of one, two, three, four or more teeth on the ratchet wheel 103.

Figure 11:
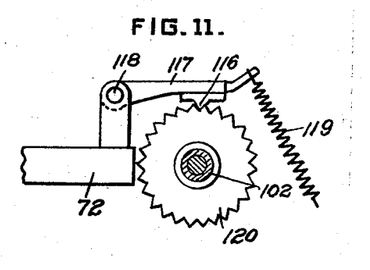
Fig. 11 a detail view of the mechanism for positioning the chuck in its various indexed positions.
Figure 13:
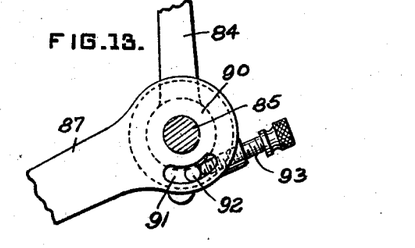
Fig. 13 a detail view of the lost motion connection between the arms of the lever employed for moving the grinding discs towards and from the chuck.
Figure 14:
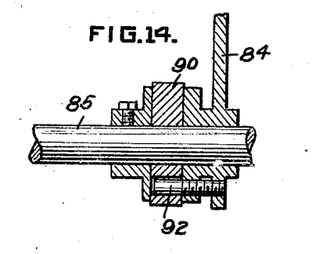
Fig. 14 is a sectional view through the parts illustrated in Fig. 13.

The chuck shaft is held in indexed position by means of a tooth 116 carried by arm 117 pivoted at 118 to an extension of one of the top cross frame members 72 and held by means of helical spring 119 in engagement with a notched wheel 120 secured to the chuck shaft 102. This means holds the chuck shaft accurately in indexed position.

The operation of the machine is automatically stopped at the completion of the design around the tumbler by the following means: As before pointed out the pulley 9 is loose on shaft 8. It is arranged to be connected to said shaft by the following clutch means: Pulley 9 carries on its outer face a tooth 122 arranged to cooperate with an oppositely arranged tooth 123 on the collar 124 secured to shaft 8. A helical spring 125 between collar 125 and pulley 9 normally moves the pulley lengthwise of shaft 8 to hold these teeth out of engaging position. Surrounding shaft 8 on the opposite side of pulley 9 is a collar 126 provided with a beveled projection 127 cooperating with a beveled notch 128 in the end of the bearing 129 of shaft 8. Obviously when collar 126 is rotated projection 127 will ride out of the notch 128 and thus move pulley 9 longitudinally on shaft 8 to bring the teeth 122 and 123 into engaging relation. Collar 126 carries the clutch lever 11 hereinbefore referred to, which lever has connected thereto one end of a helical spring 130 whose opposite end is secured to a stud on the frame of the machine, and thus acts to normally hold the lever 11 and collar 126 in position to allow the spring 125 to hold the teeth 122 and 123 out of engaging position. To hold these teeth in engaging position lever 11 is held in rotated position by means of a dog 131 slidably mounted in a bearing 132 in the frame and normally held in its outer position by means of coil spring 133. This dog has a beveled outer face so that lever 11 can slip past the same when the machine is thrown into operation, and said dog serves to hold the lever in this position until the completion of the cutting operation. To disengage said lever at the completion of the cutting of a complete design, dog 131 is retracted from its lever holding position by the following means: Said dog at its inner end is pivotally connected to the lower end of a lever 135 fulcrumed to the frame at 136 and having its upward extension provided with a beveled projection 137 which is adapted to be contacted by a point 138 secured to the chuck shaft 102 when said shaft has made a complete rotation. Contact of point 138 with projection 137 operates lever 135 to draw the dog 131 inwardly, thus releasing lever 11 and allowing spring 130 to rotate lever 11 and collar 126 backwardly until projection 127 can enter notch 128, whereupon spring 125 will separate pulley 9 from driving engagement with collar 124. In this way the operation of the machine is automatically stopped upon the completion of a complete design around the tumbler or other article. Lever 135 can also be used to withdraw, by hand, the dog 131 and stop the machine at any stage of the cutting when this becomes necessary for any reason.

Figure 7:
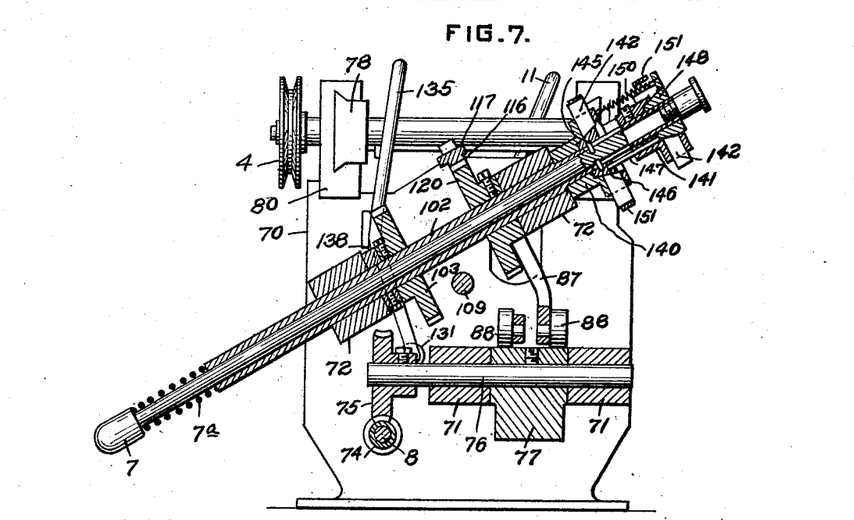
Fig. 7 a vertical section taken through the chuck of the machine illustrated in Fig. 6.

The chuck for holding the tumbler or other article being cut comprises two heads 140 and 141 secured to the hollow shaft 102 with a plurality of expanding elements 142 mounted in said heads to be radially movable therein. The operating rod 7 extends through the hollow shaft 102 and is normally held in retracted position by spiral spring 7ª. At its upper end this rod carries a cross piece 145 which extends through slots in the hollow shaft 102 and into a conical expanding sleeve 146, which cooperates with the expanding elements of the lowermost head. Rods 147 are secured to this conical sleeve and extend through openings in the head 141 and contact with an upper conical expanding sleeve 148 which cooperates with the expanding elements on the upper head 141. This conical sleeve 148 is normally retracted by helical springs 150. The expanding elements of each of the heads 140 and 141 are surrounded by elastic bands 151, which serve not only to retract the said expanding elements but also as friction means for engaging the interior of the tumbler or other article being ground. Consequently by this construction whenever the rod 7 is pushed upwardly the expanding elements in the chuck heads are retracted to permit a finished tumbler to be removed and a new tumbler placed on the chuck and when said rod 7 is retracted by spiral spring 7ª, the conical sleeves push the radial expanding elements 142 outwardly and thus secures the new tumbler to the chuck.

The rod 7 can be actuated by any suitable means. As shown the angle lever 55 pivoted at 56 has its shorter arm engaging the end of rod 7, while its longer arm can be lifted by any suitable means. When using an individual hand machine this can be effected from a treadle, or the like, but in an automatic machine having a plurality of cutting or grinding means mounted on a table, as herein described, this is effected through a single cam as hereinbefore described.

It is thus seen that the invention provides an apparatus which can simultaneously cut a plurality of articles in which each grinding machine finishes the desired cutting operation during one complete rotation of the table, in which each machine is actuated to release the finished product at a predetermined point and to receive a new blank, in which a single product is released at a time, one which is compact and efficient in operation, and one requiring the minimum attention of the operator attending it.

I claim:

1. A glass cutting apparatus comprising a base, a table rotatably supported thereby, a plurality of grinding machines mounted on the table each being provided with a chuck for gripping the article to be cut and with a grinding element, means for rotating the table, gearing between said means and chucks to rotate the same, gearing between said means and the grinding elements to cause actuation thereof, means associated with each machine for disconnecting its chuck-driving means at a predetermined point in the revolution of the table, means for releasing the chuck of each machine at said predetermined point, and means for connecting the chuck-driving means of each machine upon the release of the chuck of an adjacent machine.

2. A glass cutting apparatus comprising a base, a table rotatably supported thereby, a plurality of grinding machines mounted on the table each being provided with a chuck for gripping the article to be cut, and with a grinding element, means for rotating the table, gearing between said means and chucks to rotate the same, gearing between said means and the grinding elements to cause actuation thereof, means associated with each machine for disconnecting its chuck driving means at a predetermined point in the revolution of the table, means for releasing the chuck of each machine at said predetermined point, means for actuating the chuck to its gripping position after passing said point, and means for connecting the chuck driving means of each machine upon the release of the chuck of an adjacent machine, the operative connection between the table driving means and chuck rotating means being so related that the chuck is rotated a complete turn during each revolution of the table.

3. A glass cutting apparatus comprising a base having an annular track, a rotatable table provided with an annulus riding on said track, gearing for rotating the table, a plurality of grinding machines carried on the table, each being provided with a chuck and with a grinding element, a cam device fixed to the base and projecting within said annulus adjacent the table, a bell crank associated with each machine having one arm adapted to contact the chuck releasing means thereof and its other arm operatively connected with the cam during a predetermined period of each revolution of the table, chuck rotating means associated with each machine, a clutch interposed in said last named means, a clutch actuating means operated by motion of the said bell crank of an adjacent machine, whereby movement of the bell crank to release the chuck of said adjacent machine will cause the clutch to be engaged to cause rotation of its chuck.

4. A grinding machine comprising a frame, a rotatable chuck mounted therein, a block slidable towards and from the chuck, a shaft journaled in the block and having a grinder fixed thereto, a bell crank lever pivoted in the frame, one arm of which has an operative engagement with the said block for actuating the same, and the other arm of which is resiliently urged in a direction to permit the block to cause the grinder to contact the article being cut, and means for intermittently moving the second named arm in the opposite direction to cause separation of the grinder and said article.

5. A grinding machine comprising a frame, a rotatable chuck mounted therein, a block slidable towards and from the chuck, a shaft journaled in the block and having a grinder fixed thereto, a bell crank lever pivoted in the frame, one arm of which has an operative engagement with said block, for actuating the same, and the other arm of which is urged in a direction to permit the block to cause the grinder to contact the article being cut, and means for moving the second named arm in the opposite direction to cause separation of said grinder and article, the two arms of the bell crank being connected by a lost motion connection.

6. A grinding machine comprising a frame, a rotatable chuck mounted therein, a block slidable towards and from the chuck, a shaft journaled thereto, a bell crank lever pivoted in the frame, one arm of which has an operative engagement with the said block for actuating the same, and the other arm of which is urged in a direction to permit the block to cause the grinder to contact the article being cut, means for moving the second named arm in the opposite direction to cause separation of the grinder and article, the two arms of the bell crank being connected by a lost motion connection, and means to vary the degree of lost motion therebetween, whereby to accommodate the grinder to articles of varying size.

7. A grinding machine comprising a frame, a chuck mounted therein for gripping the article to be cut and adapted to be intermittently rotated step-by-step, a ratchet wheel fixed to the chuck to rotate the same, a grinder slidably mounted in the frame, capable of movement towards and from the chuck, a cam shaft journaled in the frame, a bell crank, one arm of which is operatively connected with the grinder for causing actuation thereof, and the other arm of which contacts the cam on said cam shaft for periodically moving the grinder away from the chuck, an extension on the last mentioned arm, a dog associated with said ratchet wheel operated by said extension for intermittently rotating the chuck.

8. A grinding machine comprising a frame, a chuck mounted therein for gripping the article to be cut and adapted to be intermittently rotated step-by-step, a ratchet wheel fixed to the chuck to rotate the same, a locking gear also fixed thereto, a spring-pressed detent cooperating with said gear, a grinder slidably mounted in the frame capable of movement towards and from the chuck, a cam shaft journaled in the frame, a bell crank one arm of which is operatively connected with the grinder for causing actuation thereof, and the other arm of which contacts the cam on said cam shaft for periodically moving the grinder away from the chuck, an extension on the last named arm, and a dog associated with said ratchet wheel operated by said extension for intermittently rotating the chuck.

9. A grinding machine comprising a frame, a chuck mounted therein for gripping the article to be cut and adapted to be intermittently rotated step-by-step, a ratchet wheel fixed to the chuck to rotate the same, a finger also fixed thereto, a grinder slidably mounted in the frame capable of movement towards and from the chuck, a cam shaft journaled in the frame, driving means including an interposed clutch for driving the cam shaft, a bell crank one arm of which has operative connection with the grinder for moving it and the other arm of which engages the cam on the cam shaft for periodically moving the grinder away from the chuck, an extension on the last named arm, a dog associated with the said ratchet wheel operated by the extension for intermittently rotating the chuck, and means actuated by the said finger for disconnecting the said clutch after each revolution of the chuck.

10. A grinding machine comprising a frame, a chuck mounted therein for gripping the article to be cut and adapted to be intermittently rotated step-by-step, a ratchet wheel fixed to the chuck to rotate the same, a grinder slidably mounted in the frame capable of movement towards and from the chuck, a cam shaft journaled in the frame, a bell crank one arm of which has operative connection with the grinder for causing actuation thereof, and the other arm of which contacts the cam on said cam shaft for periodically moving the grinder away from the chuck, an extension on the last mentioned arm, a dog engaging the ratchet wheel operated by said extension for rotating the chuck, and means for varying the effective movement of the dog whereby to vary the extent of rotation of the chuck.

11. A grinding machine comprising a frame, a chuck, a rock shaft mounted in the frame, grinding mechanism movable toward and from the chuck, an arm fixed to the rock shaft and connected to the grinding mechanism for moving the same, resilient means for urging the grinding mechanism towards the chuck, a rotatable cam, a second arm having a lost motion connection with the rock shaft engaging said cam, and means controlled by the size of the article on the chuck for limiting the movement of the grinding mechanism towards the chuck, the lost motion connection permitting the second arm to move with the cam after movement of the grinding mechanism towards the chuck is arrested.

In testimony whereof, I sign my name.

JAMES BOYD GREER.